United States Patent [19]
Ozawa et al.

[11] Patent Number: 5,711,845
[45] Date of Patent: Jan. 27, 1998

[54] DEVICE FOR GLUING AN ORNAMENTAL BODY

[75] Inventors: Fukuji Ozawa, Okazaki; Hisamoto Tsuiki, Hoi-gun; Tetsu Yabuno, Tyokawa, all of Japan

[73] Assignee: Sintokogio, Ltd., Japan

[21] Appl. No.: 624,978

[22] Filed: Mar. 28, 1996

[30] Foreign Application Priority Data

Mar. 31, 1995 [JP] Japan .................... 7-100148

[51] Int. Cl.⁶ .................... B30B 5/00; B32B 31/20
[52] U.S. Cl. .................... 156/477.1; 156/212; 156/475; 156/581; 156/583.91; 100/237; 425/419
[58] Field of Search .................... 156/475, 477.1, 156/580, 581, 583.91, 228, 212, 214; 100/237; 425/419

[56] References Cited

U.S. PATENT DOCUMENTS

| | | | |
|---|---|---|---|
| 4,908,084 | 3/1990 | Assink | 156/212 |
| 5,032,206 | 7/1991 | Sigerist | 156/477.1 |
| 5,076,880 | 12/1991 | Spengler et al. | 156/475 |
| 5,324,384 | 6/1994 | Spengler | 156/581 |
| 5,494,546 | 2/1996 | Horvath | 156/212 |

FOREIGN PATENT DOCUMENTS 6-36407  5/1994  Japan .................... A44C 27/00

Primary Examiner—Michele K. Yoder
Attorney, Agent, or Firm—Limbach & Limbach LLP

[57] ABSTRACT

A device is disclosed for gluing an ornamental body (S) onto a shaped body (W). The device aims to minimize the elongation of the ornamental body and the residual stress in it when it is fitted in a concave part (B) of the shaped body (W) to provide a product of good quality wherein no separation of the ornamental body from the shaped body occurs. The device includes a lower die (2) securely mounted on a lower surface plate (1), a receiving plate (4) which is vertically movable by elevators (3) and disposed just above the lower surface plate (1), and which has an opening analogous to and larger than the outline of a fitting groove (M) formed in the shaped body, a plurality of clampers (5) mounted on the receiving plate at the periphery of the opening such that they face the opening and surround it, an upper die (7) fixedly suspended from an upper surface plane (6), the upper die having a pre-pressing member (7A) vertically movable and the outline of the member being smaller than that of the fitting groove, and pressing bars (9) suspended from the upper surface plate that corresponds to the receiving plate.

4 Claims, 5 Drawing Sheets

DEVICE FOR GLUING AN ORNAMENTAL BODY

FIELD OF THE INVENTION

This invention relates to a device for gluing a sheet-type ornamental body such as a skin, cloth, bonded fabric, carpet, etc. onto a shaped body.

DESCRIPTION OF THE PRIOR ART

Conventionally, when an ornamental body is glued onto a shaped body such as door trim of a motor vehicle, a device as in FIG. 5 is generally used. It includes an upper die 21, clampers 22, 22, and a lower die 23, as in FIGS. 5 and 6, wherein the lower surface of the upper die 21 fits on the surface on a shaped body on the lower die 23. In the operation of this device, a shaped body W' is set on the lower die 23, and an ornamental body S', which is disposed above the surface of the shaped body, is spread over the shaped body and tensioned. The edges of the ornamental body S' are held by the clampers 22, and the upper die 21 is then lowered, thereby pressing and gluing the ornamental body S' by means of the lower surface of the upper die 21 to the shaped body.

In the operation of the device, however, if an ornamental body S' is glued onto a shaped body W' which has a concave part, the downward movement of the lower die 21 causes the ornamental body S' to contact the upper edges of the concave part before it contacts the rest of the concave part (see FIG. 6). Since an adhesive is applied to either of the surface of the shaped body W' or the lower surface of the ornamental body S', a part of the ornamental body below the edges of the concave part is further tensioned when the upper die 21 is moved further down to glue the body S' onto the concave part. Thus there is a residual stress in the body S' glued onto it, thereby causing a drawback in that after the upper die 21 is moved up, the body S' floats or is separated from the shaped body W' onto which it was previously glued.

SUMMARY OF THE INVENTION

This invention aims to resolve the drawback and provide a device for gluing a sheet-type ornamental body onto a shaped body wherein the elongation of the ornamental body and the residual tensile stress in it are minimized when the ornamental body is pressed against a concave part of the shaped body by a convex member, thereby producing a product of good quality free of any separation of the ornamental body from the shaped body.

To this end, the device of the present invention for gluing an ornamental body onto a shaped body formed with a fitting groove includes a lower die fixedly mounted on an upper surface of a lower surface plate, a vertically movable receiving plate disposed just above the lower surface plate, the receiving plate having an opening therein which is generally analogous to and slightly larger than the outline of the fitting groove, a plurality of clampers mounted on the upper surface of the receiving plate at the peripheral part of the opening, for clamping the ornamental body, such that the clampers are directed towards the opening and move towards and away from the opening, a vertically movable surface plate disposed above the lower surface plate, an upper die secured to the upper surface plate, the upper die having a pre-pressing member vertically movable relative to the upper die, the outline of the pre-pressing member being generally analogous to and slightly smaller than the outline of the fitting groove, and a pressing bar attached to the upper surface plate for pushing the receiving plate.

By the structure of this device, when an ornamental body is pressed against and glued to a shaped body placed on a lower die, the ornamental body is preformed along the convex shape of the upper die by the downward movement of the upper die and the movement of the clampers. When the upper die is lowered further, the pre-pressing member presses and glues the ornamental body to a concave part of the shaped body. The upper die, excluding the pre-pressing member, is then lowered, to completely glue the ornamental body onto the shaped body.

DESCRIPTION OF THE PREFERRED EMBODIMENT

Figure 1:
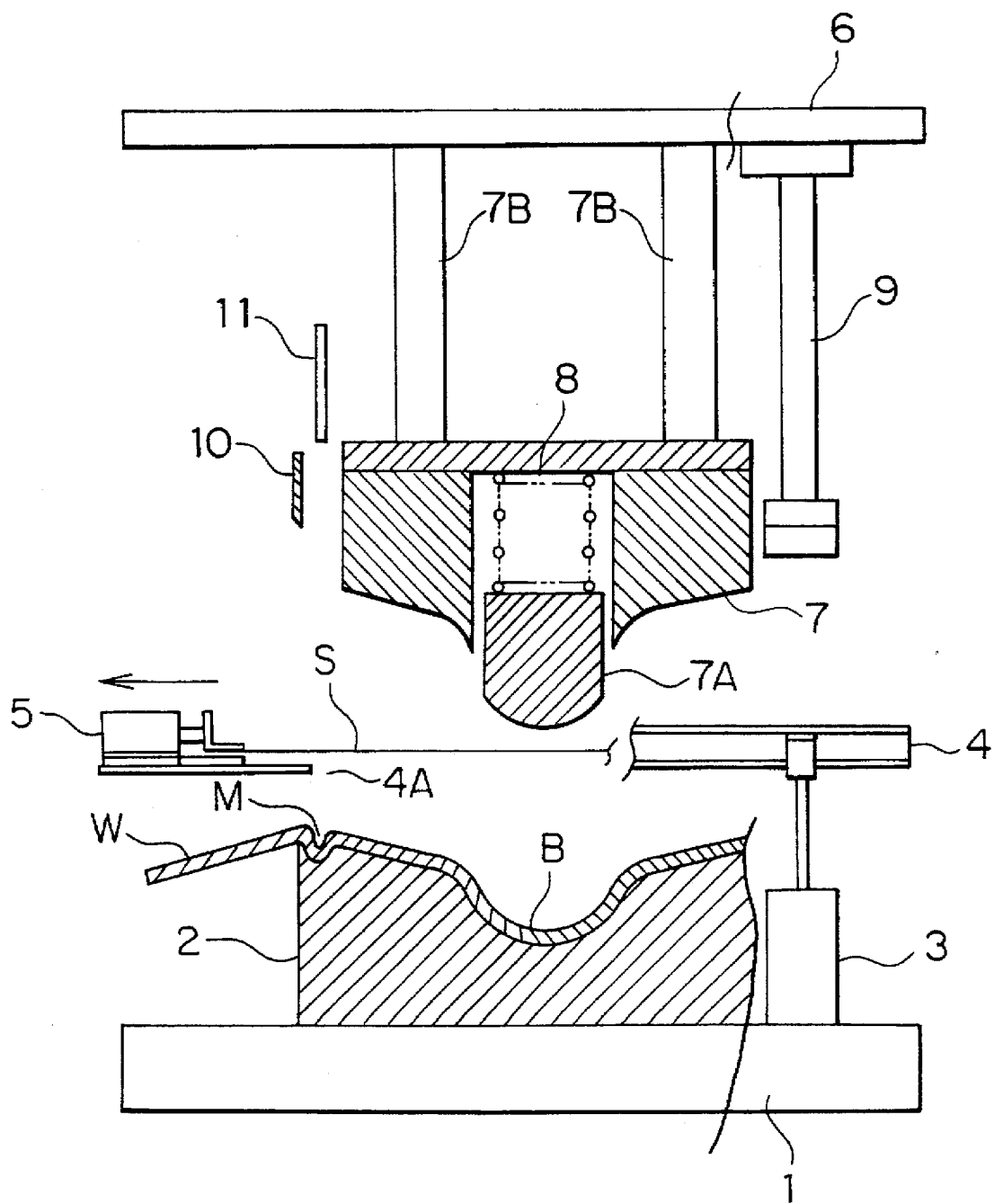
FIG. 1 is a schematic sectional view of the embodiment of the device of the present invention, showing the state before an ornamental body is glued onto a shaped body.
Figure 2:
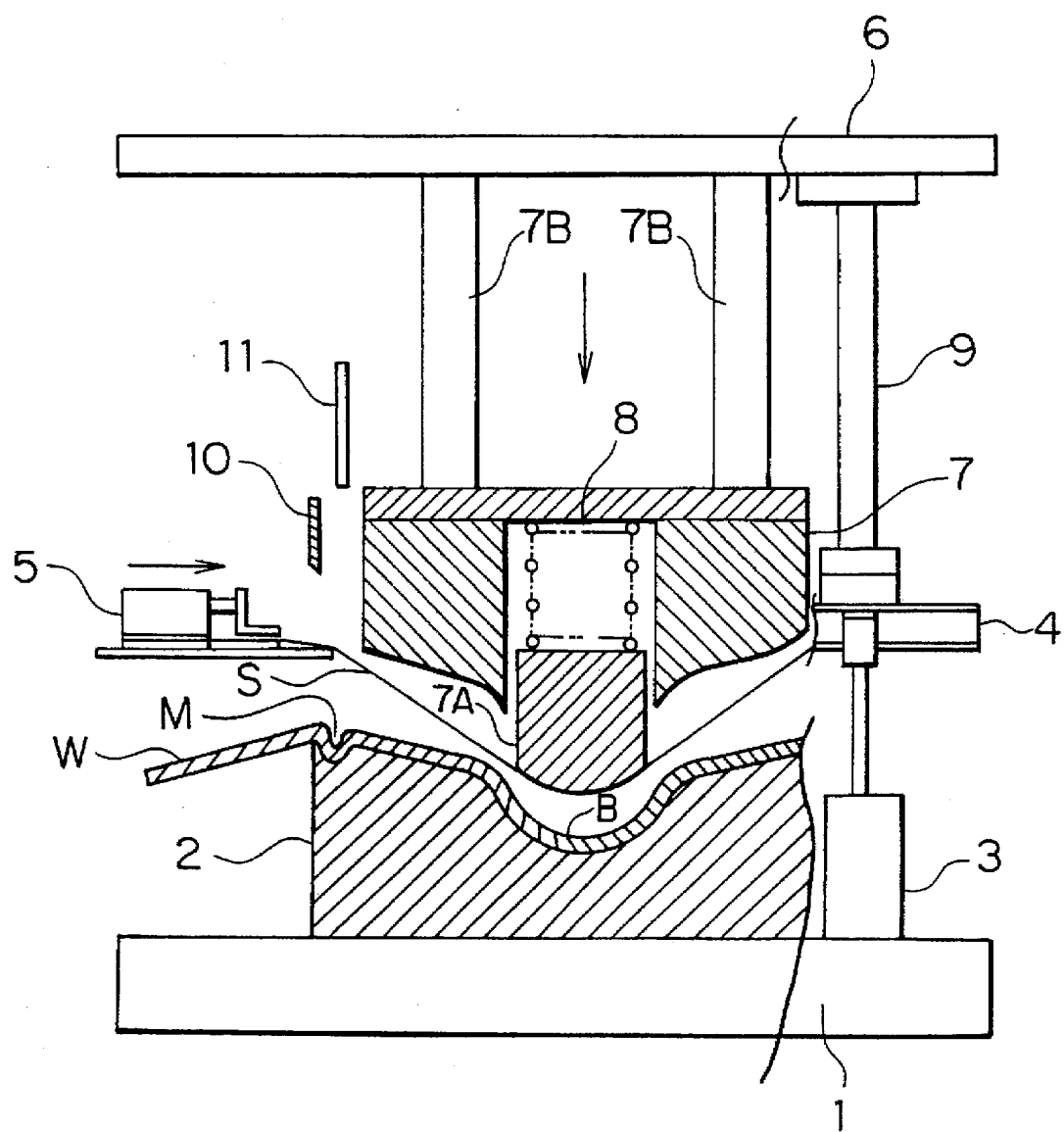
FIG. 2 is a schematic sectional view of the embodiment, showing the ornamental body when the gluing starts.
Figure 3:
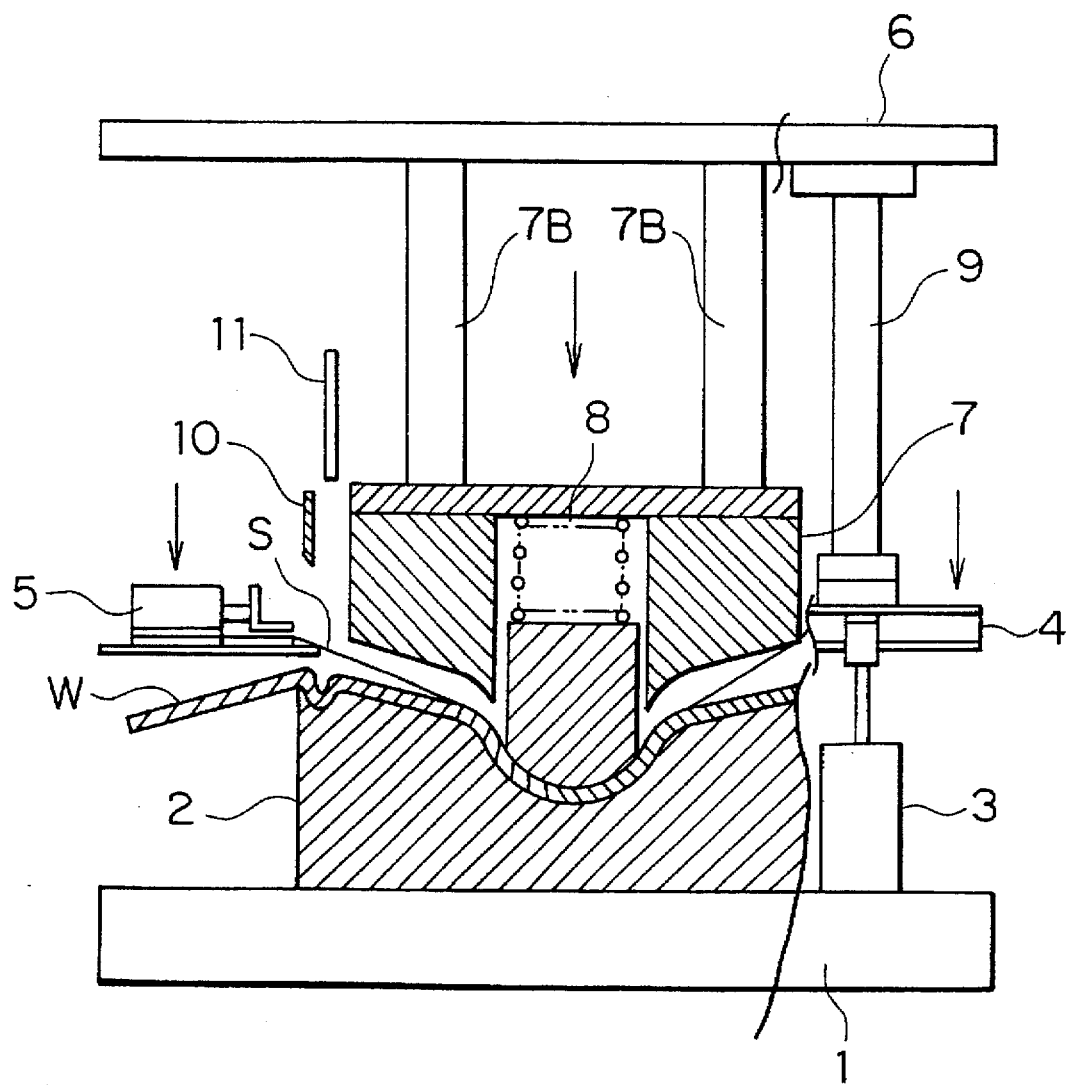
FIG. 3 is a schematic sectional view of the embodiment during gluing.
Figure 4:
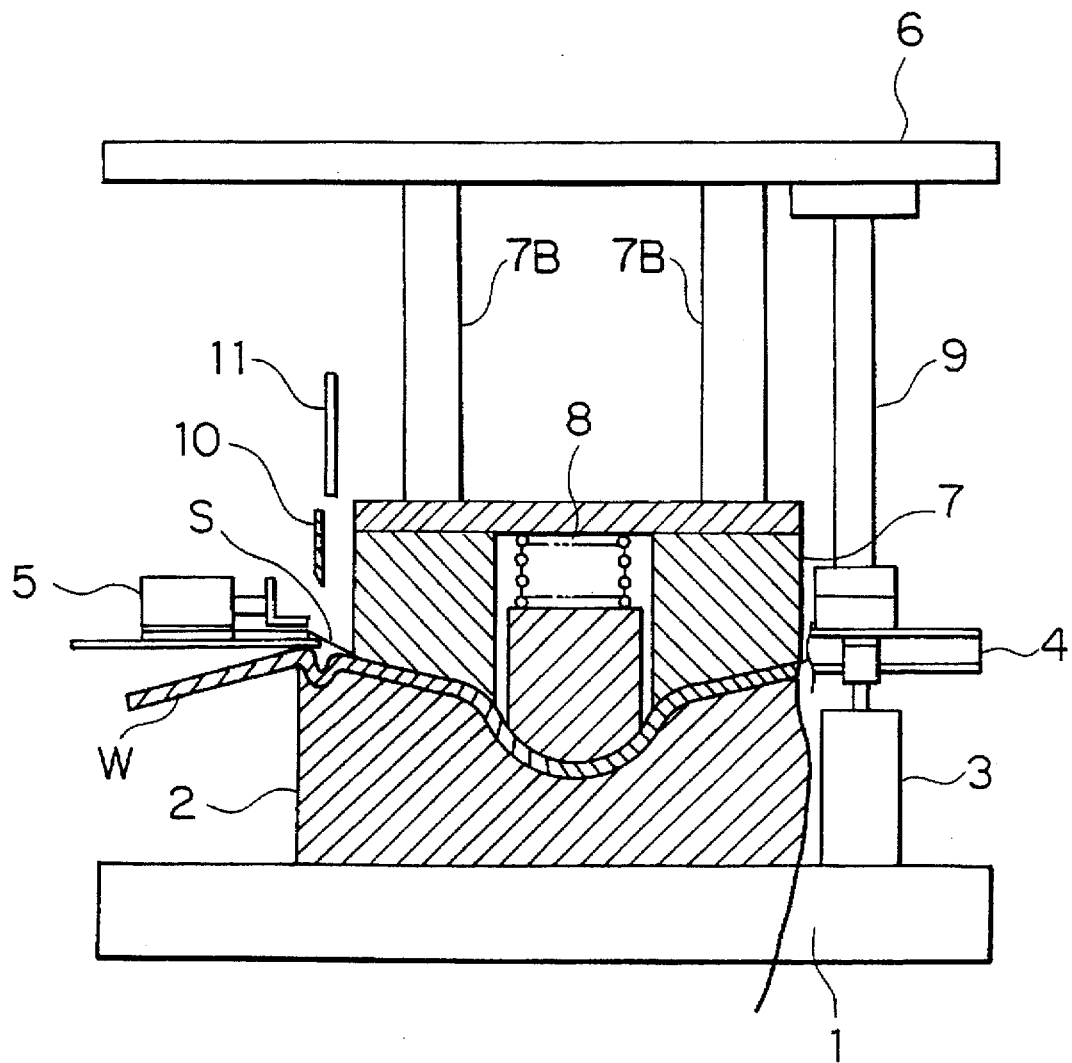
FIG. 4 is a schematic sectional view of the embodiment, showing the completion of gluing.
Figure 5:
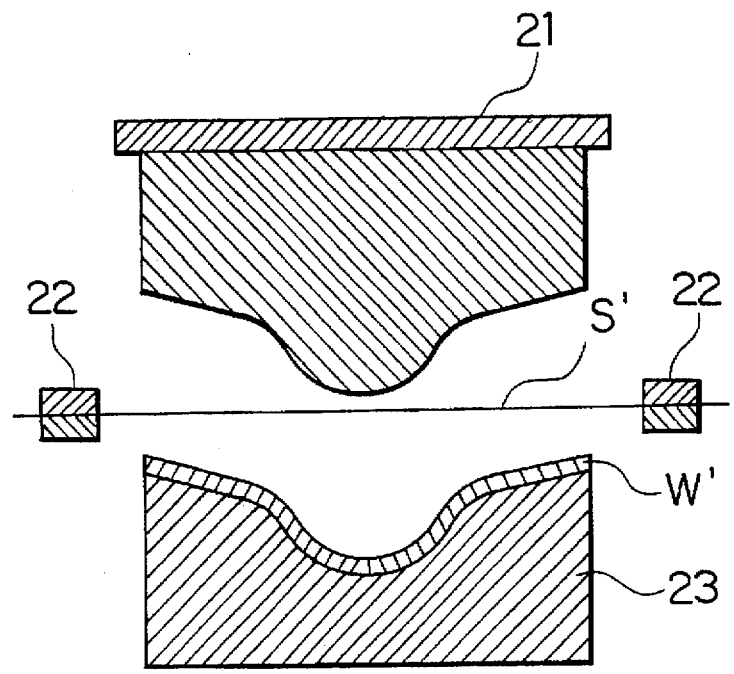
FIGS. 5 and 6 are schematic sectional views of a conventional device, showing the state before an ornamental body is glued onto a shaped body.
Figure 6:
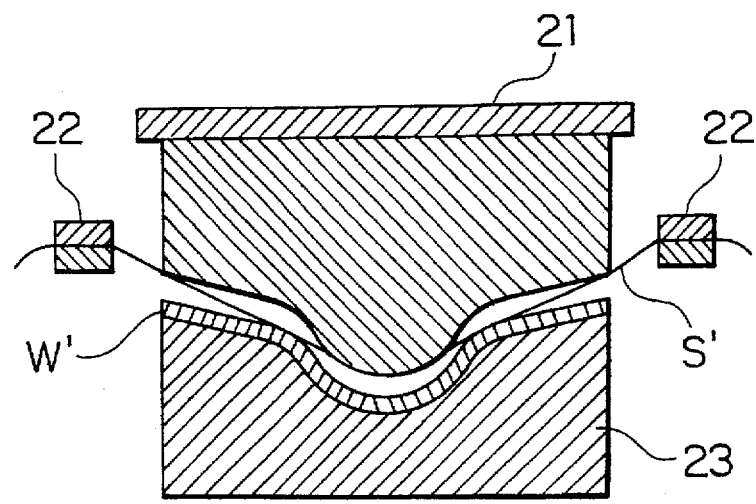

The embodiment of the present invention will now be explained by referring to FIGS. 1–4. As in FIG. 1, a lower die 2 is securely mounted on a lower surface plane 1. The upper surface of the lower die 2 is shaped such that it corresponds to a concave part B and a fitting groove M of a shaped body W. A plurality of upright elevating cylinders 3, 3 are disposed around the lower die on the lower surface plate (only one cylinder is shown in the drawing). The end portions of the rods of the cylinders support a receiving plate 4 above the lower die such that the receiving plate 4 is vertically movable. The receiving plate 4 has an opening 4A which is generally analogous to and slightly larger than the outline of the fitting groove M.

A plurality of clampers 5, 5 (only one clamper is shown in the drawing) are mounted on the receiving plate 4 at the periphery of the opening such that they are directed towards the opening 4A and surround it and such that they can move towards and away from the opening 4A and hold the ornamental body and apply a tension to it (refer to Japanese Utility Model Kokai Koho 6-36407).

A vertically movable upper surface plate 6, which corresponds to the lower surface plate 1, is disposed above the receiving plate 4. An upper die 7, which corresponds to the lower die 2, is suspended from the upper surface plate 6 through frames 7B, 7B. The upper die 7 has an outline, or outer periphery, which is generally analogous to and slightly smaller than the inner diameter of the fitting groove M. The upper die 7 at its central part has a pre-pressing member 7A which is suspended therefrom through a spring 8 such that the member 7A projects from the upper die 7 and can move vertically relative to the upper die 7. The member 7A has a lower surface which corresponds to the concave part B of the shaped body W.

A plurality of pressing bars 9, 9 (Only one bar is shown in the drawing) are disposed around the upper die 7. The bars 9, 9 are designed such that they come into contact with the receiving plate 4 before the upper die 7 contacts the shaped body W on the lower die 2 when the upper surface plate 6 is lowered, and such that the bars press the receiving plate 4 down against the pushing-up force of the elevating cylinders 3,3.

Numerals 10 and 11 are respectively an annular heated cutter and fitting edge, both connected to cylinders (not shown). In the embodiment shown in the drawing, cylinders are used for lifting the receiving plate. They may be substituted by springs.

The process of gluing an ornamental body onto a shaped body will now be explained by reference to the device designed as described above. First, as in FIG. 1, a formed body W is placed on the lower die 2 so that it fits in it, and an ornamental body S is held by the clampers 5,5 at its periphery so that they apply a tension to the ornamental body.

Then the upper surface plate 6 is lowered. Accordingly, first the pre-pressing member 7A begins to press the ornamental body S as in FIG. 2, and the clampers 5, 5 move towards the opening 7. The ornamental body S is preformed in a shape corresponding to the lower surface of the pre-pressing member 7A and lowered. As the downward movement of the upper surface plane 6 continues, the pressing bars 9,9 come into contact with the upper surface of the receiving plate 4, thereby lowering the plate 4 and the ornamental body S and finally pressing and gluing the ornamental body S onto the concave part B of the shaped body W, as in FIG. 3. When the further downward movement of the plate 6 continues, the pre-pressing member 7A moves into the upper die 7 relative to it, and the upper die 7 and the receiving plate 4 move further down, while the clampers 5, 5 move towards the opening 4A. Accordingly, the ornamental body S is completely pressed against the formed body W and glued onto it as in FIG. 4, while the downward movement of the upper surface plate 6 stops.

Since during the process the ornamental body S is glued onto the formed body W from its concave part B to its outer part, almost no residual stress is caused in the ornamental body S glued onto the body W.

The heated cutter 10 is then lowered to trim any unnecessary part away from the body S, and a fitting edge 11 is lowered to fit the trimmed edge of the body S in the fitting groove M. Thus the process is completed.

As is clearly seen from the above description, by using the device of the present invention the downward movement of the upper die and movement of the receiving plate and clampers are phased, thereby preforming the ornamental body in the convex shape corresponding to that of the upper die, gluing the ornamental body onto the concave part of the shaped body first, and then gluing the other part. Thus almost no residual stress is caused in the ornamental body glued on the shaped body, and a product of good quality is manufactured wherein there is no separation of the ornamental body from the shaped body.

What we claim is:

1. A device for gluing an ornamental body onto a shaped body, wherein the shaped body has an upper surface and a lower surface and is formed with a fitting groove, comprising:

a lower die fixedly mounted on an upper surface of a lower surface plate, the lower die having a die surface whose shape corresponds to the lower surface of the shaped body;

a vertically movable receiving plate disposed above the lower surface plate, the receiving plate having an opening therein, the opening having a periphery generally analogous to and slightly larger than the outline of the fitting groove;

a plurality of clampers movably mounted on an upper surface of the receiving plate around the periphery of the opening, wherein the clampers are configured to clamp the ornamental body and the clampers are directed towards the opening so as to be capable of moving towards and away from the opening;

a vertically movable upper surface plate disposed above the lower surface plate;

an upper die secured to the upper surface plate, the upper die having a die surface whose shape corresponds to that of the upper surface of the shaped body, the upper die having a first portion having an outer periphery which is generally analogous to and slightly smaller than the outline of the fitting groove, wherein the upper die also has a pre-pressing member vertically movable relative to the first portion of the upper die, wherein the pre-pressing member has a surface which is part of the die surface of the upper die; and a pressing bar attached to the upper surface plate in a position so that the pressing bar engages and pushes the receiving plate when the upper surface plate moves toward said receiving plate.

2. The device of claim 1, wherein the pre-pressing member is a single block suspended from the upper die.

3. The device of claim 1, wherein the pre-pressing member is a central portion of the upper die, said central portion of the upper die is suspended by a spring from the first portion of the upper die so as to be movable relative to said first portion of the upper die, and said first portion of the upper die is fixedly attached to the upper surface plate.

4. The device of claim 3, wherein the pre-pressing member and the pressing bar are shaped and positioned so that when the upper surface plate is lowered toward the lower surface plate with the ornamental body being clamped by the clampers and the shaped body resting on the lower die, the pressing bar engages the receiving plate and moves said receiving plate downward, the pre-pressing member then engages a central portion of the ornamental body and pushes the central portion of the ornamental body against the shaped body, and then the first portion of the upper die then engages an outer portion of the ornamental body and pushes the outer portion of the ornamental body against the shaped body.

* * * * *